United States Patent [19]

Honkanen et al.

[11] 4,056,587
[45] Nov. 1, 1977

[54] PROCESS FOR EXPANDING

[75] Inventors: Arvid Honkanen, Spartanburg; Paul Joonase, Taylors, both of S.C.

[73] Assignee: W. R. Grace & Co., Duncan, S.C.

[21] Appl. No.: 624,152

[22] Filed: Oct. 20, 1975

[51] Int. Cl.² .............................................. B29D 27/00
[52] U.S. Cl. ........................................ 264/53; 264/55;
  264/321; 264/345; 264/DIG. 5; 264/DIG. 15
[58] Field of Search ............ 264/321, 51, 53, DIG. 4,
  264/DIG. 15, 26, 48, DIG. 5, 55, 345

[56] References Cited

U.S. PATENT DOCUMENTS

| | | | |
|---|---|---|---|
| 2,857,625 | 10/1955 | Carlson | 264/321 X |
| 3,010,157 | 11/1961 | Cizek | 264/26 |
| 3,060,513 | 10/1962 | Klink et al. | 264/26 |
| 3,082,483 | 3/1963 | Bickford | 264/DIG. 15 |
| 3,119,147 | 1/1964 | Kracht | 264/321 X |
| 3,200,437 | 8/1965 | Sasanko | 264/DIG. 4 |
| 3,242,238 | 3/1966 | Edberg et al. | 264/26 |
| 3,262,625 | 7/1966 | Russell et al. | 264/45.6 X |
| 3,300,551 | 1/1967 | Shelby | 264/45.6 |
| 3,334,169 | 8/1967 | Erceg et al. | 264/321 |
| 3,335,207 | 8/1967 | Richie | 264/48 |
| 3,364,519 | 1/1968 | Pitsch | 264/48 X |
| 3,823,047 | 7/1974 | Colombo | 156/322 |
| 3,848,038 | 11/1974 | Dench | 264/26 X |
| 3,853,972 | 12/1974 | Berner | 264/53 |

FOREIGN PATENT DOCUMENTS

| | | | |
|---|---|---|---|
| 854,586 | 11/1960 | United Kingdom | 264/53 |

OTHER PUBLICATIONS

Bender, Rene J., "Handbook of Foamed Plastics", Libertyville, Ill., Lake Publ. Corp., c. 1965, pp. 242–243.
Skinner, S. J.; S. Baxter, S. D. Eagleton and P. J. Gray, "How Polystyrene Foam Expands" in *Modern Plastics*, Jan. 1965, pp. 171–174, 176, 178.

*Primary Examiner*—Philip Anderson
*Attorney, Agent, or Firm*—John J. Toney; William D. Lee, Jr.; John B. Hardaway

[57] ABSTRACT

Foam styrene polymer sheet is expanded to form foam products having lower density by a process which includes (a) contacting the foam styrene polymer sheet with an aqueous composition, (b) maintaining the aqueous composition in contact with the sheet to effect impregnation of the sheet by the aqueous composition, and thereafter (c) heating the impregnated sheet to expand the sheet. The expanded products are useful as thermal insulation and packaging material.

27 Claims, 1 Drawing Figure

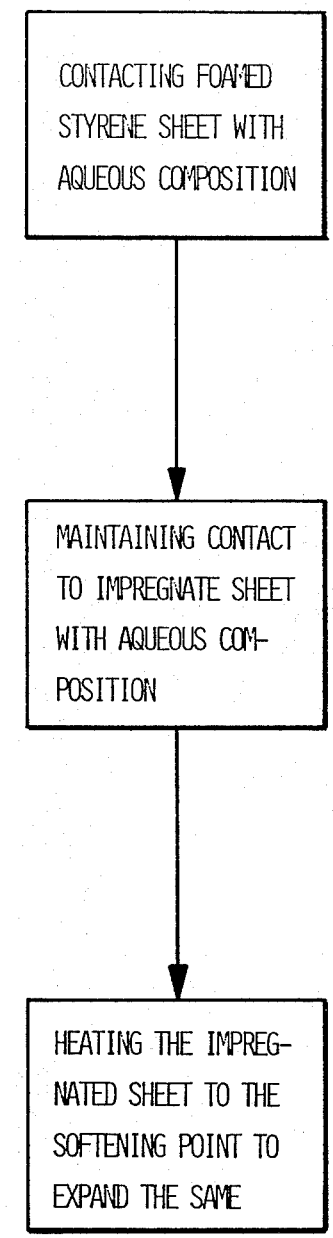

PROCESS FOR EXPANDING

BACKGROUND OF THE INVENTION

This invention relates to a process for expanding a foam styrene polymer sheet wherein the sheet is impregnated with aqueous composition.

U.S. Pat. No. 2,857,625 (Carlson, Jr.) discloses a method for preparing extruded styrene polymer foams of low density which includes contacting an extruded styrene polymer foam with liquid or vaporized water heated to at least 90° C.

U.S. Pat. No. 2,797,443 (Carlson, Jr.) discloses a process of making low density foam polystyrene of small uniform cell size by blending a mixture of the polymer, pentane, and between 2.0 and 3% water, and immediately thereafter extruding the blend.

U.S. Pat. No. 3,631,133 (Battigelli) discloses a process for making low density polystyrene beads which includes step-wise expansion of the beads by alternately steaming and "conditioning" by passing warm air over a bead mass while the mass is "in silo".

U.S. Pat. No. 3,341,638 to Mandel discloses a method of forming foam polystyrene panels wherein a layer of pre-foamed expandable polystyrene particles is sprayed with a wetting agent dissolved in water to humidify the particles. Immediately thereafter the layer is expanded by heating in an electric field.

*Modern Plastics*, January 1965, at pages 171-178 includes an article by Skinner et al., "How polystyrene foam expands." Table I at page 173 purports to give permeability of thermoplastic films to gases. The article notes that there are "no published data on permeation through membranes as thin as those in expanded polystyrene."

British Pat. No. 854,586 relates to a method of extruding expandable polystyrene to obtain tubing with a minimum thickness, wherein the extruded foamed polystyrene may be subjected to hot water or steam post expansion.

Production of porous shaped articles from thermoplastic materials is described in U.S. Pat. Nos. 2,744,291 (Stastny et al.) and 2,787,809 (Stastny).

Numerous methods are known for expanding foam styrene polymer sheets wherein air is incorporated into the sheets, as by air permeation of extruded styrene polymer sheets. Expansion methods using permeation with air have not been entirely satisfactory in many commercial applications in that long periods, e.g., 72 hours, are required to effect air permeation to an extent effective for obtaining sufficient expansion upon subsequent heating.

Colombo, U.S. Pat. No. 3,823,047, discloses a method wherein a polystyrene foam web stored for at least 24 hours in air at atmospheric pressure undergoes increase in thickness by subsequent heating.

It has now been found by practice of the present invention that foam styrene polymer sheet can be expanded to form low density foam or cellular products by a method wherein the foam sheet is contacted with aqueous composition, e.g., water, preferably at a temperature below 90° C. (192° F.). Contact of the foam sheet with water may advantageously be maintained at a relatively low temperature and for a relatively short period of time to effect impregnation with little or no expansion. Highly expanded foam styrene polymer products having minimum apparent density may be formed by heating the impregnated foam sheet to the softening point of the styrene polymer. Typically, substantially less time is required for effective impregnation with aqueous composition relative to the time required to impregnate foam styrene polymer with air using heretofore known methods for making low density foam products.

As used herein "apparent density" means the mass per unit volume of a material, where the unit volume includes voids.

As used herein, the term "softening point" is the temperature at which there is an abrupt drop in the modulus of elasticity as the material is heated from its hard and stiff state; and, for most polymers, this point can be said to approximate the glass transition temperature or be somewhat less than the glass transition temperature. For polystyrene, the modulus of elasticity begins dropping abruptly at about 82° C. (180° F.) while the glass transition temperature is about 100° C. (212° F.).

The "softening range" is the temperature range which extends from the softening point to a temperature corresponding to the beginning of a low modulus region where the material begins to behave like rubber or where the molecules exhibit free flowing characteristics. The softening range of polystyrene is from about 180° F. to about 230° F.

The term "sheet" as used herein means an article having two surfaces larger in area than any other single surface of the article and includes but is not limited to thin sheets, i.e., having thickness less than 0.125 inch. The sheets may be tubular, flat, i.e., the planes in which each large surface lies are generally parallel each to the other, or of other shape.

BRIEF DESCRIPTION OF DRAWINGS

Generally stated, the present invention provides a process for expanding a foam styrene polymer sheet, which comprises a. contacting the foam styrene polymer sheet with an aqueous composition, b. maintaining the aqueous composition in contact with the sheet to effect impregnation of the sheet by the aqueous composition, and c. heating the impregnated sheet to expand the sheet.

Practice of the present invention will be made more fully apparent by the following detailed description.

Foam styrene polymer sheets useful as starting materials in the present invention are well known in the art and may be prepared, for example, by the processes described by Cogliano in U.S. Pat. No. 3,822,331 and Sisson in U.S. Pat. No. 2,917,217. In general, thin, flexible foamed polystyrene sheet may be formed by heat expandable beads of foamable polystyrene to a fluid, plastic state under pressure in an extruder and extruding the expansible fluid mass through an orifice or die opening to a zone of lower pressure to form a foamed polystyrene sheet composed of a multitude of closed interconnected thin walled cells.

Foam styrene polymer sheets which may be expanded by the present process, e.g., in a thermoforming operation, may have any suitable apparent density, for example up to about 65 or more lbs./cu. ft. (pounds per cubic foot) and preferably from about 3 to about 20 lbs./cu. ft.

The foam styrene polymer sheet is initially contacted with any suitable aqueous composition, which may be water. The water may be, for example, liquid water or water vapor. Mixtures of water and one or more wetting agents effective for improving wetting of foam styrene polymers are effective. The contacting step may be carried out in any manner effective to bring the sheet into contact with the aqueous composition. Suitable methods for effecting contact include spraying liquid or gaseous aqueous composition onto the foamable sheet, immersing the foamable sheet in a bath of liquid aqueous composition, placing the sheet in an atmosphere of water vapor, and the like.

The aqueous composition and the foam sheet are preferably contacted while they are at a temperature below the softening point of the polymer. Contact at or above the softening temperature may result in premature, often non-uniform, expansion of the sheet.

The aqueous composition is maintained in contact with the foam sheet for a suitable period of time to effect impregnation of the sheet by the aqueous composition. Contact may be maintained in any suitable manner. In an embodiment, the foam sheet is immersed in a liquid bath of aqueous composition and immersion is continued for a suitable period of time to effect impregnation. In another embodiment, a film of aqueous composition is applied to one or more surfaces of the foam sheet by spraying, and the sheet having the aqueous film thereon is rolled upon itself to form adjacent sheet convolutions. The sheet is thereafter maintained in roll form, thereby maintaining contact of the sheet with the aqueous composition.

Desirably, the contact-maintaining step is carried out with the temperature of the sheet maintained below the softening point of the polymer.

Conveniently, one or more of the contacting step and the contact-maintaining step may be performed with the aqueous composition and the foam sheet at temperatures below 90° C. Temperatures in the range from about 20° C. to about 30° C. or more are found highly effective for these steps.

The aqueous composition may be impregnated into the foam sheet in any amount effective to aid expansion. Eminently suitable expansion may be observed where the amount of impregnated aqueous composition is at least 0.3 part by weight water and preferably at least 0.6 part by weight water as determined using Karl Fischer reagent, per 100 parts by weight of styrene polymer in the impregnated sheet.

The contact-maintaining time required to achieve a predetermined amount of impregnation depends on the temperature of the aqueous composition, the foam sheet being impregnated, and the conditions under which contact and contact maintenance are carried out. It has been found that a sheet of foam polystyrene having thickness of about 100 mils and basis weight of about 7.6 grams per 60 square inches of sheet surface may be impregnated with 0.3 part water per 100 parts sheet by contacting the sheet with a mixture of water vapor and air at about 90 percent relative humidity and about 73° F. (23° C.) and maintaining contact under those conditions for about 1 hour. Continuing the contact for a total of about 5 hours was found to effect impregnation to substantial water saturation of the foam sheet, that is the water was found to be present in the sheet in an amount of about 0.6 percent by weight.

The heating step is carried out by heating the impregnated sheet to or above the softening point of the polymer, thereby effecting expansion of the sheet. The heating may be carried out with the impregnated foam sheet disposed in a mold to effect formation of lower density foam articles having a size and shape corresponding to the size and shape of the mold. The heat may be supplied from any suitable heat source including, for example, heated mold surfaces, radiant heaters, and hot fluids which may be liquid or gaseous. Neither steam nor hot water is required. Heating is preferably carried out with the impregnated sheet in a substantially water-free environment or space. Hot air, preferably relatively dry, is an eminently suitable heat source.

Any suitable thermoforming procedure may be employed to carry out the heating step with simultaneous molding. Suitable thermoforming procedures include, for example, vacuum forming, pressure forming, matched-mold forming and variations and combinations thereof. Thermoforming is well known in the art and described in Modern Plastics Encyclopedia, 1972–1973, at pages 654 to 655.

Practice of the present invention is further illustrated by the following examples. Throughout the specification, including the claims which follow, all parts and percentages given are by weight unless otherwise indicated.

EXAMPLE 1

Through a tubular sheet forming die was extruded a foamable composition formed of polystyrene containing 5 percent FREON-12 (trademark for a dichlorodifluoromethane blowing agent by Du Pont) and 0.5 percent talc, thereby forming a tubular foam polystyrene sheet having apparent density of about 3.3 pounds per cubic feet and having average wall thickness of about 0.125 inch. The tube was passed through the nip of a pair of rolls within about 1 to 5 minutes after extrusion, resulting in a generally rectangular flattened foam polystyrene sheet having average thickness of about 0.250 inch. After being cooled to about 90° F. the flat sheet was sprayed uniformly with liquid water at 73° F. and thereafter placed in storage at 73° F.

At the end of a 24-hour storage period, during which time the sprayed sheet was maintained at 70°–80° F., the sheet was placed in a thermoformer having upper and lower heaters maintained at 380° F. and 360° F., respectively. Thermoforming at a sheet temperature of about 180° to about 190° F. was continued in the mold for 5 seconds, after which time the resulting expanded molded sheet was removed, cooled to 98° F., and found to have average apparent density of 2.2 pounds per cubic foot, an average thickness of 0.38 inch, and substantially the same surface area before and after thermoforming. The sheet was judged useful for insulating board applications.

EXAMPLE 2

The thermoformed polystyrene sheet of Example 1 was again sprayed with water at 73° F. and thereafter wrapped in polyethylene film. After storing the wrapped sheet for 24 hours, the sheet was removed and the thermoforming procedure of Example 1 was repeated using a molding cycle of 8 seconds, an upper heater temperature of 360° F. and a lower heater temperature of 350° F. The resulting twice expanded sheet was found to be further expanded, to have thickness of 0.55 inch, apparent density of 1.5 pounds per cubic foot and substantially the same surface area before and after thermoforming. This sheet was judged useful as insulating board.

EXAMPLE 3

An extruded foam polystyrene sheet having average apparent density of 4.8 pounds per cubic foot and substantially uniform thickness of about 100 mils was prepared substantially using the extrusion procedure of Example 1 except from a mixture of polystyrene, 0.4 percent sodium bicarbonate, 0.3 percent citric acid and 4.8 percent pentane. Fourteen months after extrusion, the sheet was sprayed with a water mist supplied from a spray can containing water at 73° F. pressurized with air at a pressure of 40 pounds per square inch. The sprayed sheet was rolled upon itself to form adjoining convolutions, and stored in air at 73° F. for 24 hours, at the end of which time the resulting impregnated sheet was unrolled and heated to about 180°–190° F. in a thermoformer using a thermoformer operated substantially as set forth in Example 1. Apparent density and thickness of the resulting expanded sheet were found to be 2.0 pounds per cubic foot and 220 mils, respectively. The sheet had substantially the same surface area before and after thermoforming.

A portion of the extruded sheet expanded to only 2.8 pounds per cubic foot when the foregoing procedure of this example was repeated except that the water treatment was omitted.

EXAMPLE 4

The procedure of Example 3 was repeated except that the period of storage of the water-sprayed sheet was 6 hours. The thermoformer was a matched-mold former adapted to form a tray for displaying meat. The expanded tray product was found to have thickness of 200 mils, apparent density of 2.2 pounds per cubic foot, and good texture.

EXAMPLE 5

The procedure of Example 4 was repeated except the water was replaced by an aqueous composition containing 1 percent Nacconol 90F (a Na linear alkyl aryl sulfonate wetting agent by Allied Chemical Corp.) dissolved in water, and the period of storage of the sprayed sheet was 18 hours. The foam polystyrene sheet expanded to a thickness of 220 mils. This highly expanded sheet had an apparent density of 2.0 pounds per cubic feet. Observations showed that this tray-shaped foam sheet had more uniform texture and greater freedom from water spots than the tray formed in Example 4.

The styrene polymer foams treated by the process of this invention are preferably prepared from foamable styrene polymer compositions including a suitable styrene polymer, a volatile foaming agent, and optionally a bubble-nucleating agent.

Styrene polymers which may be employed in the invention include homopolymers of styrene and interpolymers of styrene containing a predominant portion of styrene units, i.e., greater than 50 weight percent and preferably greater than 75 weight percent styrene units. Examples of monomers that may be interpolymerized with the styrene include conjugated 1,3-dienes, e.g., butadiene, isoprene, and the like; alpha-beta-unsaturated monocarboxylic acids and derivatives thereof, e.g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, and the like. If desired, blends of the styrene polymer with other polymers may be employed, e.g., blends of the styrene polymer with rubbery diene polymers, or compositions obtained by dissolving a rubbery diene polymer in the styrene monomer and subsequently polymerizing the mixture. In any of the above type polymers, all or a portion of the styrene may be replaced with its closely related homologues such as alpha-methylstyrene, o-, m-, and p-methylstyrene, o-, m-, p-ethylstyrene, 2,4-dimethylstyrene, and the like. In general, the styrene polymers employed have a molecular weight in the range of from about 40,000 to about 80,000 (as determined by the Staudinger method). Volatile foaming agents which may be included in the foamable styrene polymer compositions desirably boil within the range of from about 10° to about 80° C. and preferably within the range of from about 30° to about 60° C. Suitable foaming agents include pentane, dichlorodifluoromethane, trichlorofluoromethane, isopentane, cyclopentane, heptane, petroleum ethers boiling within the previously described temperature ranges, and the like.

Solid bubble-nucleating agents for nucleating foaming of styrene polymers are well known and are exemplified by sodium-bicarbonate-citric acid, talc and the like. While suitable bubble nucleation may occur without requiring a nucleation agent, typically such an agent is either included in the polymeric feed or added to the polymeric melt in the extrusion-foaming operation.

Almost any wetting agent may be included in the aqueous composition. In general wetting agents or surfactants which may be present effectively in the aqueous composition include alkali metal soaps; anionic, nonionic, cationic, ampholytic and zwitterionic synthetic surfactants; long chain tertiary amine oxides; long chain tertiary phosphine oxides; long chain dialkyl sulfoxides; mixtures thereof; and the like. Wetting or surface-active agents are well known in the art and described, for example, in U.S. Pat. No. 3,324,038 (Chaffee et al.) and McCutheon's Detergents & Emulsifiers, 1975 North American Edition, MC Publishing Co., Glen Rock, N.J.

Alkali metal soaps suitable herein include sodium and potassium salts of higher fatty acids of naturally occurring plant or animal esters (e.g., palm oil, coconut oil, babassu oil, soybean oil, castor oil, tallow, whale and fish oils, grease and lard, and mixtures thereof) or of synthetically produced fatty acids (e.g., rosin and those resin acids in tall oil) and/or of naphthenic acids, mixtures thereof, and the like.

Anionic synthetic non-soap surfactants or detergents suitable herein include water-soluble salts, preferably alkali metal salts, of organic sulfuric reaction products having in their molecular structure an alkyl radical containing from about 8 to about 22 carbon atoms and a radical selected from the group consisting of sulfonic acid and sulfuric acid ester radicals. (Included in the term alkyl is the alkyl portion of higher acyl radicals.) Anionic synthetic detergents which may be included in the aqueous composition include sodium or potassium alkyl sulfates, preferably sulfates obtained by sulfating higher alcohols ($C_8$–$C_{18}$ carbon atoms) produced by reducing the glycerides of tallow or coconut oil; sodium or potassium alkyl benzene sulfonates, in which the alkyl group contains from about 9 to about 15 carbon atoms, a number of which are described in U.S. Pat. Nos. 2,220,099 and 2,477,383; sodium alkyl glyceryl ether sulfonates, preferably sulfonated ethers of the higher alcohols derived from tallow and coconut oil; sodium coconut oil fatty acid monoglyceride sulfates and sulfonates; sodium or potassium salts of sulfuric acid esters of the reaction product of one mole of a higher fatty alcohol (e.g., tallow or coconut oil alcohols) and about 1 to 6 mols of ethylene oxide; sodium or potassium salts of alkyl phenol ethylene oxide ether sulfate with about 1 to about 10 units of ethylene oxide per molecule and in which the alkyl radicals contain about 8 to about 12 carbon atoms; the reaction product of fatty acids esterified with isethionic acid and neutralized with sodium hydroxide where, for example, the fatty acids are derived from coconut oil; sodium or potassium salts of fatty acid amide of a methyl tauride, the fatty acids having been derived for example from coconut oil; mixtures thereof and the like.

Ampholytic or amphoteric synthetic surfactants suitable herein include sodium 3-dodecylaminopropionate, sodium 3-dodecylaminopropane sulfonate, dodecyl-beta-alanine, N-alkyltaurines such as the one prepared by reacting dodecylamine with sodium isethionate according to the teaching of U.S. Pat. No. 2,658,072, N-higher alkyl aspartic acids such as those produced according to the teaching of U.S. Pat. No. 2,438,091, and the products sold under the trade name "Miranol" and described in U.S. Pat. No. 2,528,378, mixtures thereof and the like.

Zwitterionic synthetic surfactants suitable herein include 3-(N,N-dimethyl-N-hexadecylammonio) propane-1-sulfonate and 3-(N,N-dimethyl-N-hexadecylammonio)-2-hydroxy propane-1-sulfonate, mixtures thereof, and the like.

Long chain tertiary amine oxides suitable herein include dimethyldodecyl amine oxide, dimethyloctylamine oxide, dimethyldecylamine oxide, dimethyltetradecylamine oxide, dimethylhexadecylamine oxide, mixtures thereof and the like.

Long chain tertiary phosphine oxides suitable herein include dodecyldimethylphosphine oxide, tetradecyldimethylphosphine oxide, tetradecylmethylethylphosphine oxide, cetyldimethylphosphine oxide, stearyldimethylphosphine oxide, cetylethylpropylphosphine oxide, dodecyldiethylphosphine oxide, tetradecyldiethylphosphine oxide, dodecyldipropylphosphine oxide, dodecyldi (hydroxymethyl) phosphine oxide, dodecylidi (2-hydroxymethyl) phosphine oxide, tetradecylmethyl-2-hydroxypropyl phosphine oxide, oleyldimethylphosphine oxide, 2-hydroxydodecyldimethylphosphine oxide, mixtures thereof and the like.

Long chain dialkyl sulfoxides suitable herein include octadecyl methyl sulfoxide, dodecyl methyl sulfoxide, tetradecyl methyl sulfoxide, 3-methoxytridecyl methyl sulfoxide, 3-hydroxytridecyl methyl sulfoxide, 3-hydroxy-4-dodecoxybutyl methyl sulfoxide, mixtures thereof, and the like.

Nonionic synthetic surfactants suitable herein include water-soluble surfactant compounds produced by the condensation of hydrophilic alkylene oxide groups with an aliphatic or alkyl aromatic organic hydrophoric compound. The length of the hydrophilic or polyoxyalkylene radical which is condensed with any particular hydrophobic group can be readily adjusted to yield a water-soluble compound.

A well known class of nonionic synthetic detergents is available under the trade name of "Pluronic." These compounds are formed by condensing ethylene oxide with a hydrophobic base formed by the condensation of propylene oxide with propylene glycol. The hydrophobic portion of the molecule has a molecular weight of from about 1500 to 1800. The weight of the polyoxyethylene moiety is typically about 50 percent of the total weight of the condensation product.

Other nonionic synthetic surfactants suitable herein include polyethylene oxide condensates of alkyl phenons, e.g., the condensation products of ethylene oxide with alkyl phenols having an alkyl group containing from about 6 to 12 carbon atoms in either a straight chain or branched chain configuration, from about 10 to 25 moles of ethylene oxide being present per mole of alkyl phenol. The alkyl substituent may be derived from polymerized propylene, diisobutylene, octane, nonane, and the like.

Other suitable nonionic surfactants include surfactants prepared by condensation of ethylene oxide with the product resulting from the reaction of propylene oxide and ethylene diamine. Examples include compounds containing from about 40% to about 80% polyoxyethylene by weight and having a molecular weight of from about 5000 to about 11,000, resulting from the reaction of ethylene oxide groups with a hydrophobic base constituted of the reaction product of ethylene diamine and excess propylene oxide, said base having a molecular weight of the order of 2500 to 3000.

Also suitable herein are surfactant condensation products of aliphatic alcohols having from 8 to 18 carbon atoms, in either straight chain or branched chain configuration, with ethylene oxide, e.g., a coconut alcohol ethylene oxide condensate having from 10 to 30 moles of ethylene oxide per mole of coconut alcohol, the coconut alcohol fraction having from 10 to 14 carbon atoms.

Still other nonionic surfactants useful herein include linear alcohol alkoxylates such as, for example, ethanol methoxylate, methanol ethyoxylate, n-butanol ethoxylate, and the like.

Wetting agents generally preferred herein include naphthalene sulfonates, e.g., sodium dimethyl naphthalene sulfonate; sulfosuccinates, e.g., diisobutyl sodium sulfo succinate and dioctyl sodium sulfo sucinate; sorbitan derivatives, e.g., sorbitan monooleate and sorbitan monostearate; alkyl sulfonates (sulfonated fatty esters) e.g., sodium alkyl benzene sulfonate and sulfonated propyl oleate; phosphated derivatives, e.g., 2-ethyl hexyl polyphosphate ester anhydrides and sodium di(2-ethyl hexyl) phosphate; glycerol fatty esters, e.g., glycerol monolaurate and diglycerine sesqui oleate; fatty esters, e.g., butyl oleate and butyl stearate; aryl sulfonates, e.g., sodium or potassium benzene sulfonate and sodium or potassium toluene sulfonate; alkyl aryl sulfonates, e.g., Na or K dodecyl benzene sulfonate; diphenyl sulfonates, e.g., di butyl phenyl phenol sodium disulfonate; fatty ester sulfates, e.g., ammonium lauryl sulfate and sodium 2-ethyl hexyl sulfate; alcohol sulfates, e.g., lauryl alcohol sulfate and sodium (2-ethyl-1-hexanol) sulfate; ethoxylated or propoxylated alcohols, e.g., ethoxylated cetyl alcohol, propoxylated cetyl alcohol; and fatty glycols and polyethoxylated glycols, e.g., butoxyethyl oleate and polyethylene glycol monostearate; and mixtures thereof.

Wetting agents may be included in the aqueous composition in any effective amount, typically up to about 10 parts by weight and preferably in an amount from about 1 to about 4 parts by weight based on the weight of the aqueous composition.

The foam styrene polymer sheets may include various other components such as fillers, stabilizers, antioxidants, flame retardants, dyes, pigments, surfactants and the like.

The lower density polymeric foams provided by the present invention have many and varied uses. The foams are especially useful in light weight insulating and packaging applications.

It is to be understood that the foregoing detailed description is given merely by way of illustration and that various modifications may be made therein without departing from the spirit or scope of the present invention.

What is claimed is:

1. A process for further expanding a previously expanded styrene polymer foam sheet comprising the steps of:
impregnating the previously expanded styrene polymer foam sheet with an aqueous composition to the extent of at least 0.3 parts of aqueous composition per 100 parts of styrene polymer; and
heating the thus impregnated sheet to at least the softening point of said styrene polymer to soften said polymer and to volatilize said aqueous composition within the porosity of said foam sheet to thus expand said foam sheet by the action of said volatilized aqueous composition to a greater extent than any expansion which would be produced in the absence of said aqueous composition.

2. The process of claim 1 wherein the temperatures of the aqueous composition and the sheet are less than 90° C. in said step of impregnating.

3. The process of claim 1 wherein the aqueous composition in said step of impregnating is a liquid.

4. The process of claim 3 wherein the liquid is water.

5. The process of claim 3 wherein the liquid is a mixture of water with a wetting agent.

6. The process of claim 5 wherein the wetting agent is a linear alkyl aryl sulfonate.

7. The process of claim 3 wherein the liquid composition is at a temperature of from about 20° C to about 30° C.

8. The process of claim 1 wherein the aqueous composition in said step of impregnating is water vapor.

9. The process of claim 8 wherein the water vapor is at a temperature below 90° C.

10. The process of claim 1 wherein the foam styrene polymer sheet is impregnated with at least 0.3 percent by weight water.

11. The process of claim 1 wherein the foam styrene polymer sheet is impregnated with at least 0.6 percent by weight water.

12. The process of claim 1 wherein the sheet is maintained in contact with the aqueous composition for at least 6 hours.

13. The process of claim 3 wherein the sheet is maintained in contact with the aqueous composition for at least 6 hours.

14. The process of claim 3 wherein the liquid is sprayed onto the sheet.

15. The process of claim 3 wherein the sheet is immersed in the liquid.

16. The process of claim 1 wherein said expansion of the sheet in step (c) is effected while the sheet is disposed in a mold.

17. The process of claim 1 wherein contact is maintained with the sheet rolled upon itself.

18. The process of claim 17 wherein the rolled sheet is wrapped in a packaging material having high resistance to transmission of water vapor.

19. The process of claim 17 wherein the contact is maintained with the sheet at a temperature of from about 20° to about 30° C.

20. The process of claim 1 wherein the sheet is impregnated with water in an amount effective for expanding the sheet to a bulk density of not more than 2 pounds per cubic foot.

21. The process of claim 20 wherein the sheet is expanded to not more than 2 pounds per cubic foot by heating for not more than 10 seconds.

22. The process of claim 20 wherein the sheet is expanded to not more than 2 pounds per cubic foot by heating for not more than 5 seconds.

23. The process of claim 1 wherein the sheet is an extruded sheet.

24. The process of claim 1 wherein the sheet is in a substantially water-free environment during said heating.

25. The process of claim 1 wherein the sequence of said steps is repeated to effect a second expansion of the sheet.

26. The process of claim 5 wherein the wetting agent is selected from the group consisting of alkali metal soaps; anionic, nonionic, cationic, ampholytic and zwitterionic synthetic surfactants; long chain tertiary amine oxides; long chain tertiary phosphine oxides; long chain dialkyl sulfoxides; and mixtures thereof.

27. The process of claim 5 wherein the wetting agent is selected from the group consisting of naphthalene sulfonates, sulfosuccinates, sorbitan derivatives, alkyl sulfonates (sulfonated fatty esters), phosphated derivatives, glycerol fatty esters, fatty esters, aryl sulfonates, alkyl aryl sulfonates, diphenyl sulfonates, fatty ester sulfates, alcohol sulfates, ethoxylated or propoxylated alcohols, fatty glycols, polyethoxylated glycols, and mixtures thereof.

* * * * *